United States Patent [19]
Samuels

[11] 3,741,230
[45] June 26, 1973

[54] SELF-POWERED FEEDBACK-CONTROLLED VOLATILE LIQUID DISPENSING APPARATUS

[76] Inventor: W. Edward Samuels, 3119 Essex Road, Cleveland Heights, Ohio 44118

[22] Filed: Apr. 22, 1971

[21] Appl. No.: 136,512

[52] U.S. Cl. ............................................. 137/81.5
[51] Int. Cl. ............................................. F15c 1/12
[58] Field of Search.................. 137/81.5, 386, 395, 137/391, 393; 235/201 FS, 201 PF

[56] References Cited
UNITED STATES PATENTS

| | | | |
|---|---|---|---|
| 3,416,547 | 12/1968 | Glen, Jr. et al. | 137/391 X |
| 3,470,902 | 10/1969 | Hackman | 137/386 |
| 3,527,243 | 9/1970 | Montag | 137/386 X |
| 3,661,191 | 5/1972 | Harley et al. | 137/393 X |
| 3,566,897 | 3/1971 | Collier | 137/81.5 |
| 3,538,931 | 11/1970 | Blosser, Jr. et al. | 137/81.5 |
| 3,545,468 | 12/1970 | Freeman et al. | 137/81.5 |
| 3,498,307 | 3/1970 | Adams | 137/81.5 |
| 3,542,050 | 11/1970 | Sowers III | 137/81.5 |
| 3,567,191 | 3/1971 | Morgan | 137/81.5 |
| 3,576,294 | 4/1971 | Baldwin | 137/81.5 |
| 3,581,754 | 6/1971 | Adams | 137/81.5 |
| 3,595,259 | 7/1971 | Adams | 137/81.5 |

*Primary Examiner*—Samuel Scott
*Attorney*—Ely, Golrick & Flynn

[57] ABSTRACT

Apparatus for dispensing a volatile, especially cryogenic, liquid utilizing the liquid's vapor pressure from a free gas space in a closed liquid storage vessel top region as a power source both for transferring the liquid to a receiver and for a fluidic control system sensing the liquid level in the receiver and controlling liquid transfer from the source.

7 Claims, 3 Drawing Figures

INVENTOR.
W. Edward Samuels

SELF-POWERED FEEDBACK-CONTROLLED VOLATILE LIQUID DISPENSING APPARATUS

In many situations or environments volatile liquids are to be delivered, or dispensed from a source vessel usually intermittently to a receiving vessel where a certain amount or level of liquid is to be maintained more or less accurately. The following description of the present invention and its discussion will be set forth in terms of the use of and handling of cryogenic liquids, for example, liquid nitrogen, liquid air, liquid oxygen though it is to be understood that the invention may have application in other environments and with other volatile liquids.

In the operations, and/or activities utilizing such fluids as liquid air, liquid nitrogen, liquid oxygen, for example, it is often necessary to maintain a certain level or level range, of the cold liquid in a receiving vessel where the level is continuously dropping due to evaporation. Thus a high vacuum equipment, liquid nitrogen may have to be maintained in a Dewar flask surrounding a vapor trap on the vacuum line, with a continual operator attention required for replenishment of the liquid nitrogen in the flask from time to time as required.

In view of the known and obvious inconveniences, problems, and risks in manual handling of flasks in transferring liquid nitrogen or any such cold cryogenic liquid from a supply tank to a receiver it is obviously advantageous to provide an automatic system to deliver the liquid as needed to maintain the desired minimum level on the receiving flask. Because of the extreme low temperature of the liquids being handled, ordinary pumps, and other components of glass, metal, or other common materials (apart from tubing) are less desirably used, which has led to the use of transfer systems, wherein a gas from a pressurized source, such as nitrogen from a pressure cylinder, is applied through appropriate control and reducing valves to the cryogenic liquid surface in a closed source vessel to expel it is required, through a delivery line to the receiver. Now this at times has been done under manual control, and also by liquid level control means sensing the level in the receiver, to actuate automatically a valve in the transfer-powering gas line; or where the liquid source is continuously gas-pressurized, to operates a solenoidal valve in the liquid delivery line.

Such expedients for non-manual delivery of cold liquid from the source vessel to the receiver have had one or another of awkward or undesirable features, as in relative cost or comlexity, in requiring external power sources, such as a gas pressurizing source or electric power; and with certain gases, especially liquid oxygen, in some aspects of construction or components required or in the very use of electric power, which are desirably to be avoided from safety considerations.

In brief, the present invention provides apparatus for dispensing such a liquid to a receiver to maintain at least a certain minimum level therein, by using the vapor pressure of the evaporating liquid as a propelling power source and also as an operating medium and power source in the liquid level sensing and liquid delivery control system, thus obviating the need of any external pressurizied gas source or electric power source to move the liquid, or even of use of the electric power in the control powering system; the more remote power source, of course, being the heat of the environment.

It is then the general object of the present invention to provide means and apparatus for automatically dispensing volatile, especially cryogenic, liquids to a receiver where a certain minimum level is to be maintained without need of a separate distinct special source of power.

Another object is to provide means and apparatus of the type described which avoids the use of electrically powered components such as liquid or gas pumps, solenoidal valves, mechanical contact type electrical relays and the like.

Another object is the provision of apparatus and means of the type described which may operate independently of external power sources other than ambient environmental heat.

Another object is the provision of means and apparatus of the type described which in practical sense is self-powered both for moving the cryogenic liquid and also for operation of the means sensing the need for and controlling the delivery of the liquid.

A still further object is the provision of apparatus and means of the type described, wherein a portion of the evaporating liquid is used as both a liquid-moving power supply and as a power supply for the control system.

Still another object is to provide a transfer system containing no moving parts.

Other objects and advantages will appear from the following description and the drawings wherein.

The invention here will be described in terms of the liquid nitrogen as the volatile cryogenic liquid being handled.

Figure 1:
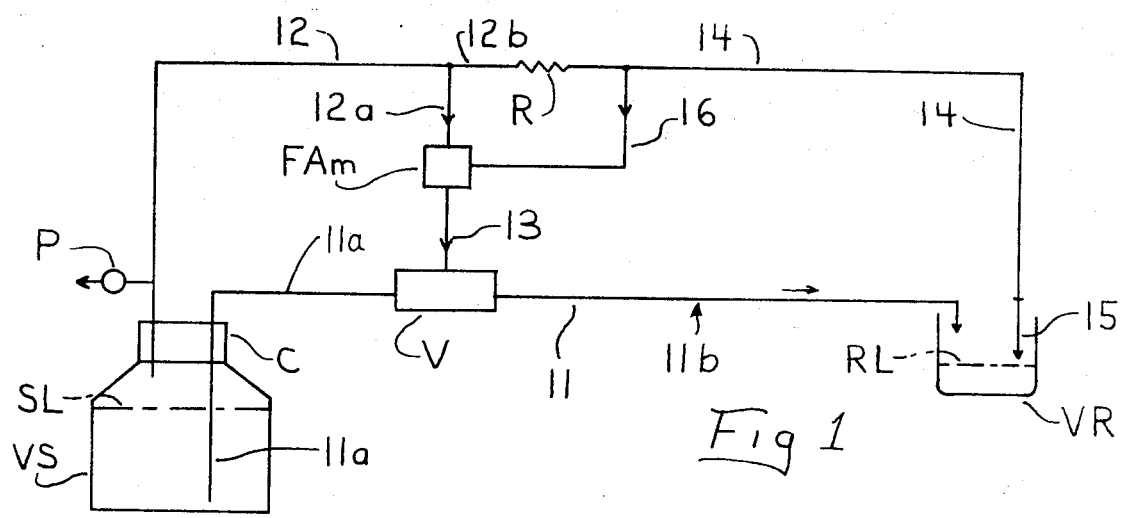
FIG. 1 is a somewhat schematic drawing of a cryogenic liquid system embodying the present invention.

In FIG. 1 the liquid nitrogen to be dispensed is contained in the closed source vessel VS, a storage Dewar flask, from which delivery is to be made as needed to maintain at least a certain minimum liquid level in the receiving vessel VR, such as an open Dewar flask surrounding a vapor trap or cold trap in a high vacuum pumping system. A liquid transfer or delivery line, designated as a whole by the general reference numeral 11, includes a riser or stand pipe portion 11a ascending from the source vessel bottom region through the vessel closure C to a gas pressure actuated liquid control valve V from which the line portion 11b runs to the receiver.

From the top region above the current surface level SL in the vessel, pressurizied nitrogen gas, arising from evaporation of the liquid, is delivered through gas line 12, provided with an adjustable pop-off relief valve P (setting line pressure at say 2 to 10 p.s.i.) and branching through 12a to a fluidic digital amplifier device FA$m$ and through 12b and a flow resistor or restriction R to a gas delivery line portion 14 as a sensor line terminating in a sensor or probe 15 located in the receiver as hereinafter explained. A back pressure signal deriving from the sensor or probe 15 is fed back through 14 and input line 16 connected from the gas delivery line 14 on the downstream side of the resistor R, to the input port of the device FA$m$.

Through the controlled or output port device FA$m$ gas pressure is applied through the line 13 to the pressure actuated valve V to control its operation. The valve V may be, for example, a diaphragm type valve (preferably a snap-action type even where FAm is digital in operation) wherein the communication between the ports for the lines 11a, 11b, is controlled by a flexible diaphragm biased to close off such ports in one position and to put them in communication in the second portion, responsively to the pressure applied through line 13; or a spring return biased shiftable spool valve, wherein ports for the lines 11a and 11b are similarly controlled by shifting of the spool, responsive to pressure applied through line 13 to one end of the spool element as a piston.

Where a "fail-safe" design requires that no liquid be delivered under failure conditions, such valve V is biased normally-closed. Of course, where "fail-safe" design considerations require valve V to be normally open, a connection from V is used to an output port in device FA m which is normally non-pressurized when a low level signal from probe 15 is not present. If perchance an analog type proportional fluidic amplifier is used for device FAm, then a snap-action type valve V is to be used.

The probe 15 may be either a proximity type or bubbler type probe in structure or mode of operation, and may comprise a separate suitable nozzle at the end of line 14, or may be a free end terminal portion of line 14, where its bore size, shape, and placement relative to surface RL are suitable as are known to the art; the end of the probe 15 being positioned in the receiving vessel at or with a certain relation to that level desired to be maintained as a minimum liquid level. Nitrogen gas, continuously bleeding at a low rate (e.g., 1 microliter/second) through the flow restriction R (selected for the flow rate desired) to the probe, develops a back pressure, which will obviously decrease with decrease in height of the receiver liquid level RL above the probe tip, when its tip is immersed; or where a non-immersed, proximity sensing arrangement is used, and within the operable range of such disposition, with the increasing spacing between that liquid surface and the probe nozzle directing gas perpendicularly to the liquid surface.

As the liquid level RL drops, whether with an immersed so-called bubbler type or proximity type probe, a certain point is reached when the decreasing back pressure signal is such that the device FAm changes its state or mode to cause gas pressure from line 12 to be applied through line 13 to actuate the valve V open, allowing liquid to be delivered to the receiving vessel by virtue of the pressure of the nitrogen gas on the space above the level SL in the source vessel. The consequent rising level in the receiver causes an increase in the back pressure in, and hence its feedback on, gas delivery lines 14–16. The signal applied to the input port of device FAm at a certain higher pressure then cuts off gas pressure to line 13 allowing valve V to close and cut off the liquid flow.

Since fluidic devices have an inherent signal hysteresis, that is, there is a certain minimum difference between the signal pressure at which the device is switched "on" and the signal pressure at which it is switched "off," the duration of transfer flow will be greater than a certain minimum time dependent upon the hysteresis characteristic of the device FAm itself. However, for the sensing system in which the device is used, a system signal hysteresis is determined not only by the hysteresis characteristic of FAm, but also, as known in the fluidic art by the other parameters of the sensing signal circuit such as the resistance of the line 14, capacitance of line 14, resistance ratio of lines 14 and 16, etc.

For example, the flow restriction value of R and the probe structure as well as the hysteresis of FAm affect the signal developed; and hence the relative selections available amoung the characteristics of these three elements (even without recourse to change of other parameters) provide flexibility in design choices appropriate to the level range desired. Thus R may be an adjustable component if desired for this purpose.

Figure 2:
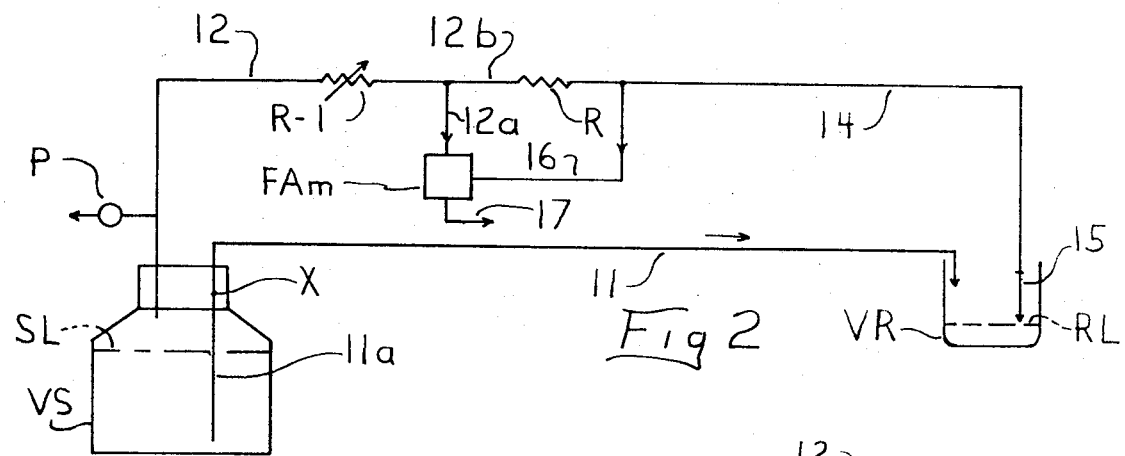
FIG. 2 is similar to FIG. 1, but showing a second embodiment of the invention.

In FIG. 2, the general configuration is similar to that of FIG. 1, but does not involve any moving parts. Like parts or elements in FIG. 2 are designated by reference numerals or legends like to those used in FIG. 1. Here the transfer line 11 itself is non-valved; and the gas pressure from the vessel VS is applied through line 12, again provided with an adjustable relief valve P, first through an adjustable resistor or flow restriction R–1, on the downstream side of which the line 12 is branching again through 12a to device FAm, and also through 12b and the restriction or resistor R to the sensor line portion 14. Again the line 16 delivers a back pressure signal from line 14 on the downstream side of R to the input port of the device FAm. The resistor R again controls the flow of nitrogen gas to the probe 15 to a very small flow rate, e.g., 1 microliter/sec. in a 3mm bore immersed probe.

The device FAm vents the gas pressure continually applied through 12 to 12a to atmosphere through the vent line 17, as long as the back pressure signal is such as to indicate that no liquid is required in the receiver. The device FAm may be identical to that of FIG. 1, using, however, for vent 17 the output port complementary to that used in FIG. 1.

Accordingly (with suitable adjustment of the pop-off P and of the adjustable resistor or restriction R–1 to compensate for ambient temperature and pressure) the nitrogen gas is being vented from the closed vessel substantially at the rate at which evaporation of the liquid nitrogen within the source vessel is occurring. These adjustments are set preferably so that the liquid nitrogen is supported, by the actual gas pressure, elevated in the stand pipe or riser tube to a point, designated X, such that delivery is quickly begun in response to a probe signal calling for liquid; obviously the disposition of the line 11 being such as to provide for quick drainage, the major portion of its length being lower than the bend just above the point X.

Here, when the back pressure fed back from the probe 15, communicated as an input signal through the lines 14 and 16 to the device FAm, drops to a certain point corresponding to the minimum liquid level RL, device FAm cuts off the gas venting of line 12; the pressure above the nitrogen surface in the storage vessel increases; and liquid nitrogen is then expelled through line 11 until the level in the receiver has risen to a point relative to the tip of the probe or sensor 15 resulting in a back pressure signal causing the device FAm again to open the vent 17 to atmosphere, relieving the pressure in line 12 and in the storage vessel and so cutting off further transfer. Again the amount delivered to a given receiver is controlled by the hysteresis of the system.

In the perhaps unusual situation where a vessel VS might feed essentially downwardly in a transfer line from its bottom, and hence not require use of the gas pressure as transfer motive power, the fluidic sensing and controlling system of FIG. 1 would be particularly useful; of course with a valve V in the transfer line.

Figure 3:
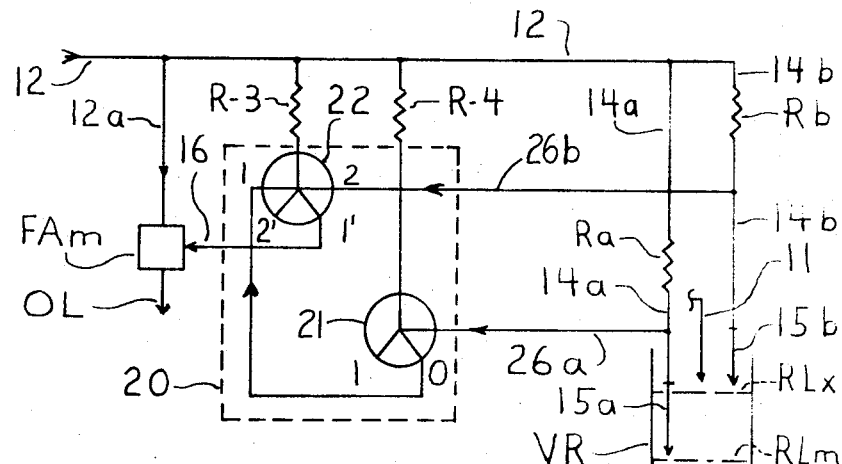
FIG. 3 is a modification of the fluidic sensing circuit of FIGS. 1 and 2.

A second embodiment of the invention appears in fragmentary form in FIG. 3, presenting only a fluidic level sensing system with the fluidic digital amplifier device controlling the transfer function in response to the sensor probe signals; this being useful irrespective of which fluid delivery line (i.e., liquid line 11 or gas line 12) is valved as the final tranfer control point. Similar reference numerals or letters are used for parts similar to those of the preceeding figures.

Here the gas pressure of line 12 is applied through lines 14a, 14b, including flow restrictions Ra and Rb to respective sensor probes 15a, 15b, positioned in the receiver for sensing a minimum desired level RLm and a maximum desired level RLx. The gas pressure is also applied through flow restrictors R-3 and R-4 to the gate arrangement enclosed in the dashed rectangle at 20 which develops a signal calling for transfer only when the probe 15a senses the desired minimum level in the receiver, but maintains that signal until the level rises to the desired maximum as sensed by 15b.

This arrangement includes the fluidic OR gate device 21 and bistable or flip-flop memory device 22, respectively supplied with operating 'gas' through R-4 and R-3. The output port 1' of memory device 22 is connected by line 16 to the signal input port of the device FAm, while the o output port of gate 21 is connected to signal input port 1 of 22. The pressure signals from the probes are again taken from the downstream sides of the restrictors Ra and Rb for application through lines 26a, 26b to the signal input port of gate 21 and the signal input port 2 of memory device 22 respectively. Thus when the receiver level drops to RLm, both probes being open and sensing lack of liquid at their tips, a signal is developed in the overall gate arrangement, hence line 16, to actuate device FAm to the condition or mode calling for and causing liquid tranfer.

The minimum or zero pressure arising when 15a senses the occurrence of the minimum level RLm causes an output from the o port of 21 to be applied to input port 1 of 22, thereby switching the latter to a stable output on its output port 1', applied to line 16 and FAm, even when the rising level in VR develops a pressure signal at the probe 15a to switch 21 to its output port 1, removing the signal from input 1 of 22.

Thus transfer continues until the liquid level has risen to the level RLx; where upon the pressure signal developed by 15b, applied to input port 2 of memory device 22 switches the output of the latter to output port 2', cutting off the signal to FAm. This again being a stable mode of device 22, even though the pressure signal from 15b disappears as the level in the receiver again drops, there is no transfer until RLm is again reached.

The output line OL from device FAm will, of course, be either line 13 to a valve as V in FIG. 1 or vent 17 as in FIG. 2, depending upon which type system is used; that is, which fluid line from the storage vessel is valved, or directly controlled.

The FIG. 3 configuration has the advantage especially for many cryogenic systems, that the sensing and control system may be more easily designed and aptly constructed for larger volume liquid transfers to be made at longer intervals, rather than more frequent but smaller transfers, as would be the more common with the single sensor probe arrangements of FIGS. 1 and 2; so that there is less likelihood of liquid loss due to the heating of small volumes passed through a delivery line which has had opportunity to warm up between the successive transfers.

It is to be understood that components may be combined into single physical entities; as for example, the function of valve V with the amplifier FAm; or the devices 21, 22 in a single component of the fluidic logic system. Also the gas powered sensing and control system as such has utility where its output is transduced for application even to say a solenoidally actuated valve.

I claim:

1. A self-powered, automatic, volatile-liquid dispensing system for delivering said liquid from a source to a receiver wherein at least a minimum liquid level is to be maintained, comprising:
   a closed source vessel having a top space region, above the liquid surface, pressurizied with vapor of the contained liquid as a pressurizied gas source space;
   a receiver vessel in which said liquid is to be maintained in an amount providing at least said minimum level;
   a liquid delivery line providing a liquid transfer path from the bottom region of the source vessel and discharging into the receiver vessel;
   a gas delivery line with one end connected to the gas pressurizied upper region of said source vessel;
   gas energized means including a fluidic amplifier receiving energizing gas from said gas line controlling transfer of the liquid from the source vessel to the receiver vessel in reponse to gas pressure signals applied to the amplifier to the amplifier input, and liquid level sensing means including a gas energized liquid level sensing probe connected to the gas line and disposed in said receiver vessel to sense occurence of the said minimum liquid level;
   the said level sensing means developing pressure signals applied to the amplifier input with a first signal condition when the receiving vessel level drops to said minimum level to initiate liquid transfer and thereafter a second signal condition to terminate liquid transfer.

2. A system as described in claim 1 including:
   a flow resistor controlling the rate of gas delivery from said gas line to said probe; and
   an adjustable pressure relief valve in the gas delivery line upstream of said resistor;
   said fluidic amplifier comprising a device controlling delivery therethrough, to complementary output ports, of gas from a point of said gas delivery line upstream of said resistor.

3. A system as described in claim 1 wherein:
   the said liquid delivery line includes a liquid flow control valve, gas pressure-actuated to one and biased to the other, of open and closed conditions and having an actuating gas pressure inlet or connection port;
   said fluidic amplifier comprising a device with complementary output ports;
   said inlet port connected to a one of the output ports such that when a back pressure signal from said level sensing means has said first and second conditions the valve is respectively open and closed.

4. Apparatus as described in claim 1 wherein:

said liquid delivery line is non-valved and rises to a point above a nominal full level of said source vessel;

and said fluidic amplifier device normally vents gas from the gas delivery line thereby normally to maintain the gas source space at a pressure close to atmospheric, when said first signal condition is absent, and when said first signal is present blocks the venting thereby to cause a gas source pressure rise to expel liquid through the liquid line to the receiver.

5. A system as described in claim 1 wherein:

a single level sensing probe is used to which gas is delivered from said gas line through a flow resistor at a low flow rate;

and back pressure signals from the probe are applied to the input of the fluidic amplifier through a connection taken downstream of said resistor.

6. A system as described in claim 1, wherein:

said level sensing means includes a second gas energized level sensing probe disposed in the receiver vessel to sense occurrence of a desired maximum level;

respective flow resistors connecting said probes to said gas line;

and fluidic logic means energized from said gas line and receiving back pressure signals of the said probes as its input and providing the pressure signals applied as the said amplifier input, with a transfer initiating first signal condition at the occurrence of said minimum level, and a transfer terminating second signal condition upon occurrence of the desired maximum level.

7. A system as described in claim 6, wherein:

said fluidic logic means comprises:

a fluidic bistable device and a fluidic OR gate device energized from the gas line;

said bistable device having first and second output ports with the first output port providing the said signals applied to the amplifier input, and having first and second input ports corresponding respectively to the first and second output ports;

the back pressure signals of the first and second said probes applied respectively to the input port of the OR gate device and to the second input port of the bistable device;

said OR gate device having that one of its complementary output ports, which is energized upon a minimum level signal from the first probe, connected to the said first input port of the bistable device.

* * * * *